Patented Feb. 23, 1926.

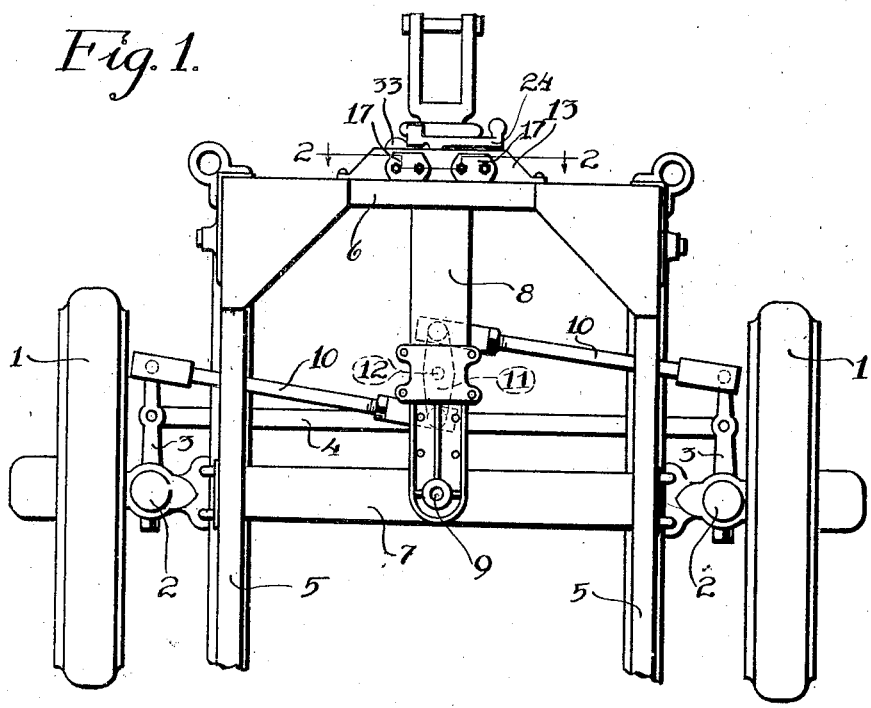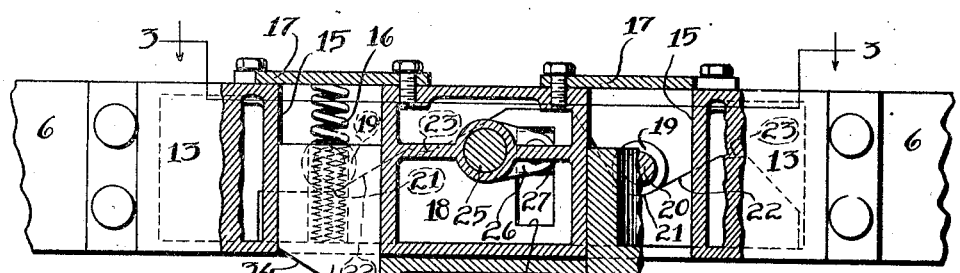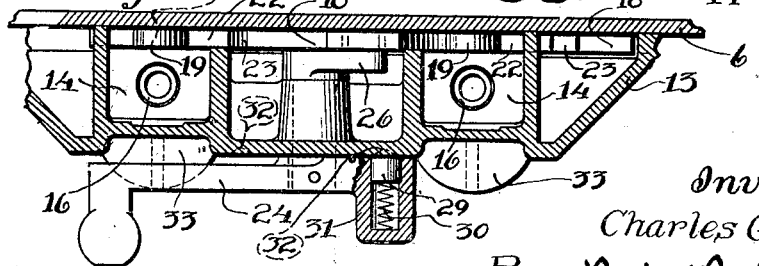

1,574,469

UNITED STATES PATENT OFFICE.

CHARLES G. CLEMENT, OF EDGERTON, WISCONSIN, ASSIGNOR TO HIGHWAY TRAILER COMPANY, OF EDGERTON, WISCONSIN, A CORPORATION OF WISCONSIN.

DRAWBAR LOCK.

Application filed September 11, 1922. Serial No. 587,261.

*To all whom it may concern:*

Be it known that I, CHARLES G. CLEMENT, a citizen of the United States, and a resident of Edgerton, in the county of Rock and State of Wisconsin, have invented certain new and useful Improvements in Drawbar Locks, of which the following is a specification, reference being had to the accompanying drawings, forming a part thereof.

The purpose of this invention is to provide a locking device for use on a trailer vehicle in which the wheels at either end of the vehicle are adapted to be used as steering wheels. The locking device is designed to secure in fixed relation to the frame the wheels at the end which is for the time being the rear end of the trailer, the wheels at the forward end being operated for steering purposes. The invention consists in various features of construction and combinations of parts hereinafter described as shown in the drawings and as indicated by the claims.

In the drawings:—

Figure 1 is a top plan view of one end of the trailer frame with its wheels and drawbar and with steering connections between the drawbar and the wheels. A lock embodying this invention is shown applied to the drawbar.

Figure 2 is a vertical section of the lock taken on a larger scale as indicated at line 2—2 on Figure 1, with one locking dog partly broken away.

Figure 3 is a detail section taken as indicated at line 3—3 on Figure 2.

Figure 1 shows the familiar elements of a trailer chassis but the illustration is limited to one end of a vehicle inasmuch as the opposite end may be understood to be of identical construction. The wheels, 1, are mounted upon an automobile type of knuckle axle having knuckles vertically swiveled at 2, 2, with steering arms, 3, 3, extending therefrom respectively and connected by a tie-rod, 4. The side frame members, 5, 5, are connected at the end by a cross member, 6, and above the axle by another cross member, 7, to which the rear end of the drawbar 8, is pivotally connected at 9. Any swinging movement of the drawbar, 8, about its pivot, 9, as caused by any deviation of the tractor vehicle made from the straight path, is transmitted to the knuckle arms, 3, 3, by a pair of drag links, 10, 10, connected to opposite ends of an evener or equalizer, 11, shown in dotted lines as being pivotally mounted at 12 on the under side of the drawbar 8. The construction thus far described is similar to that shown in my Patent No. 1,385,361 of July 26, 1921, and is chosen simply as a typical trailer construction for the purpose of illustrating the present invention embodied in the locking device about to be described.

When the wheels, 1, 1, are the rear wheels instead of the front wheels of the trailer it is desirable to lock them against steering motion about the knuckle pivots, 2, 2, and this is accomplished by fixing the drawbar, 8, to the cross frame member, 6, so that it cannot swing from side to side. The locking device is fixed to the outer vertical face of the cross member, 6, and its parts are carried in the housing, 13. A pair of locking dogs, 14, 14, are mounted for vertical sliding movement in guide ways, 15, so as to project downward adjacent each side of the drawbar 8, and thus prevent lateral movement of the draw bar under the cross member, 6, and the housing, 13. This relation is indicated in Figure 2. The dogs, 14, are normally held in locking position by compression springs, 16, pocketed in the upper ends of the dogs and reacting against plates, 17, which close the guide ways, 15, at the top.

For releasing the drawbar, 8, from the dogs, 14, the latter elements are retracted upwardly into the housing, 13, by means of a vertical cam plate, 18, which engages rollers, 19, on studs, 20, each projecting from the rear face of one of the dogs, 14. The plate 18, is mounted to slide horizontally in the housing transversely of the vehicle so that in one position the rollers, 19, rest in the low portion, 21, 21, of its cam edge but when said plate is moved to its other limit said rollers traverse the inclined portions, 22, of the edge of the plate and arrive in the upper recesses, 23, which are enough higher than the points, 21, to cause withdrawal of the dogs completely within the housing, 13, so that they will not interfere with lateral swinging movement of the drawbar, 8.

The transverse sliding movement of the cam plate, 18, may be effected conveniently by means of a crank handle, 24, mounted on the face of the housing, 13, with its crank shaft, 25, (Fig. 2) journaled in the housing and carrying at its inner end a short crank arm, 26, on which is pivoted a square block, 27, slidably engaging a vertical slot, 28, in the plate, 18. As the crank, 24, is rotated through a half turn the block, 27, engaging the slot, 28, of the plate, 18, forces the plate to move from one limiting position to the other. The parts are retained at either limit by means of a pointed detent plunger, 29, provided with a spring, 30, pocketed in a housing, 31, formed in one end of the crank arm, 24, said detent engaging one or the other of two recesses, 32, formed in the face of the housing, 13, and at opposite sides of the journal bearing for the crank shaft, 25. To further insure proper limiting of the swing of the crank arm, 24, the face of the housing, 13, is formed with flanges or ledges, 33, extending for contact with the crank arm itself at each end of its swing.

By reason of the fact that the dogs, 14, are yieldingly, instead of positively, held in locking position the cam plate, 18, may be moved to position for lowering them even while the drawbar, 8, stands at one side of its middle position in the frame, and then when the drawbar is finally shifted to such middle position its swing will be checked by one of the dogs, 14, which is already at its lower limit but it will temporarily engage the beveled face, 34, of the other dog, 14, lifting the dog until the drawbar is past it, whereupon the dog will be snapped into locking position by its spring, 16, and the drawbar will be retained as desired. Obviously this method of locking the drawbar is easier than attempting to move it accurately to its middle position and then to lower the locking dogs.

I claim:

1. In a device for the purpose described, the combination with a transverse frame member, of a horizontally movable drawbar extending across the frame member, a housing mounted on said member above the central position of the drawbar, said housing being provided with two vertical guideways at opposite sides of the central position of the drawbar, locking dogs vertically slidable in the respective guideways, independently of each other and located to engage opposite sides of the drawbar; and separate springs urging the respective dogs downwardly in projected position, the lower end of each dog having a cam face sloping laterally and upward for encounter with the drawbar as it is swung into central position.

2. The combination, with a vehicle drawbar pivotally mounted for motion in a horizontal plane, and with a crossbar at the end of the frame, extending directly above the drawbar of a vertically movable latch projecting downwardly beyond the lower face of said crossbar, the inner face of said latch touching one side of the drawbar; a slidably mounted cam for raising and lowering said latch, a rock-shaft provided with a rock-arm for actuating said cam, a crank-handle on said shaft, and a housing mounted on a vertical face of said cross-bar and embodying guideways for said latch and cam and a bearing for said rock shaft, said housing also being adapted to enclose all of said parts except the crank-handle, the lower face of said latch being beveled for encounter with the drawbar.

3. In a vehicle drawbar lock, a cast metal housing formed with guideways for a pair of independently and vertically movable locking dogs; a locking dog slidably mounted in each guideway therefor; a cam horizontally slidable in a cam guideway, and having two high points and two low points on its upper face, lateral studs on the respective locking dogs, resting upon the upper face of said cam; and springs urging the locking dogs toward the cam, the lower portions of both locking dogs projecting downwardly beyond the lower face of said housing when the cam is at one limit of its travel, and being fully retracted when the cam is at the other limit of its travel, the lower face of each locking dog being inwardly and downwardly beveled for co-operation with a drawbar.

4. In the combination recited in claim 3, plates forming top walls for the spaces above the locking dogs within the housing, and compression springs seated on said dogs and bearing upon said plates respectively.

5. The combination in a vehicle drawbar lock, of a transverse frame member, a drawbar movable horizontally in close proximity to said frame members, a pair of vertically movable independently yielding latches mounted on said frame member at opposite sides of the drawbar, each latch having normally exposed at the level of the drawbar a vertical inner face and an inwardly and downwardly inclined outer face; whereby the drawbar when moved from one side toward center position may pass one of the latches and be stopped by the other; together with a cam horizontally slidable on the frame member and followers on the respective latch dogs engaging said cam, the cam being formed for withdrawing both latches upwardly simultaneously to inoperative position, and manually operable means for so adjusting the cam.

In testimony whereof I have hereunto set my hand at Edgerton, Wisconsin, this 18th day of February, 1922.

CHARLES G. CLEMENT.